United States Patent
Noh

(10) Patent No.: US 10,254,891 B2
(45) Date of Patent: Apr. 9, 2019

(54) TOUCH SENSITIVE DISPLAY DEVICE HAVING RESISTANCE TO NOISE, AND CONTROL METHODS THEREFOR

(71) Applicant: SAMSUNG DISPLAY CO., LTD., Yongin-si, Gyeonggi-do (KR)

(72) Inventor: Jin Woo Noh, Yongin-si (KR)

(73) Assignee: Samsung Display Co., Ltd. (KR)

( * ) Notice: Subject to any disclaimer, the term of this patent is extended or adjusted under 35 U.S.C. 154(b) by 290 days.

(21) Appl. No.: 15/246,212

(22) Filed: Aug. 24, 2016

(65) Prior Publication Data

US 2017/0108991 A1    Apr. 20, 2017

(30) Foreign Application Priority Data

Oct. 16, 2015  (KR) ........................ 10-2015-0144781

(51) Int. Cl.
*G06F 3/044* (2006.01)
*G06F 3/041* (2006.01)

(52) U.S. Cl.
CPC ............ *G06F 3/0418* (2013.01); *G06F 3/044* (2013.01); *G06F 3/0412* (2013.01)

(58) Field of Classification Search
None
See application file for complete search history.

(56) References Cited

U.S. PATENT DOCUMENTS

| | | | |
|---|---|---|---|
| 9,189,113 B2 | 11/2015 | Yoshimura | |
| 2002/0075731 A1* | 6/2002 | Amano | G11C 7/02 365/196 |
| 2010/0097355 A1* | 4/2010 | Jang | G06F 3/0412 345/178 |
| 2010/0214259 A1* | 8/2010 | Philipp | G06F 3/0416 345/174 |
| 2011/0175824 A1* | 7/2011 | Chiu | G06F 3/0412 345/173 |
| 2013/0009888 A1* | 1/2013 | Park | G02F 1/13338 345/173 |
| 2013/0335338 A1* | 12/2013 | Lai | G06F 3/0412 345/173 |
| 2015/0193075 A1* | 7/2015 | Chang | G06F 3/0418 345/173 |
| 2016/0299618 A1* | 10/2016 | Liu | G06F 3/0412 |

FOREIGN PATENT DOCUMENTS

KR    10-2013-0078068 A    7/2013

* cited by examiner

*Primary Examiner* — Jennifer Mehmood
*Assistant Examiner* — Parul H Gupta
(74) *Attorney, Agent, or Firm* — Innovation Counsel LLP

(57) ABSTRACT

Disclosed is a touch sensitive display device, including: a display panel configured to display an image according to received image data; a touch sensing unit configured to generate touch sensing signals in response to a touch; a data analyzing unit configured to determine a noise period from the image data; and a touch control unit configured to set a sensing period that is outside the noise period, and to calculate a touch position based on the touch sensing signals corresponding to the sensing period and not to the noise period.

14 Claims, 8 Drawing Sheets

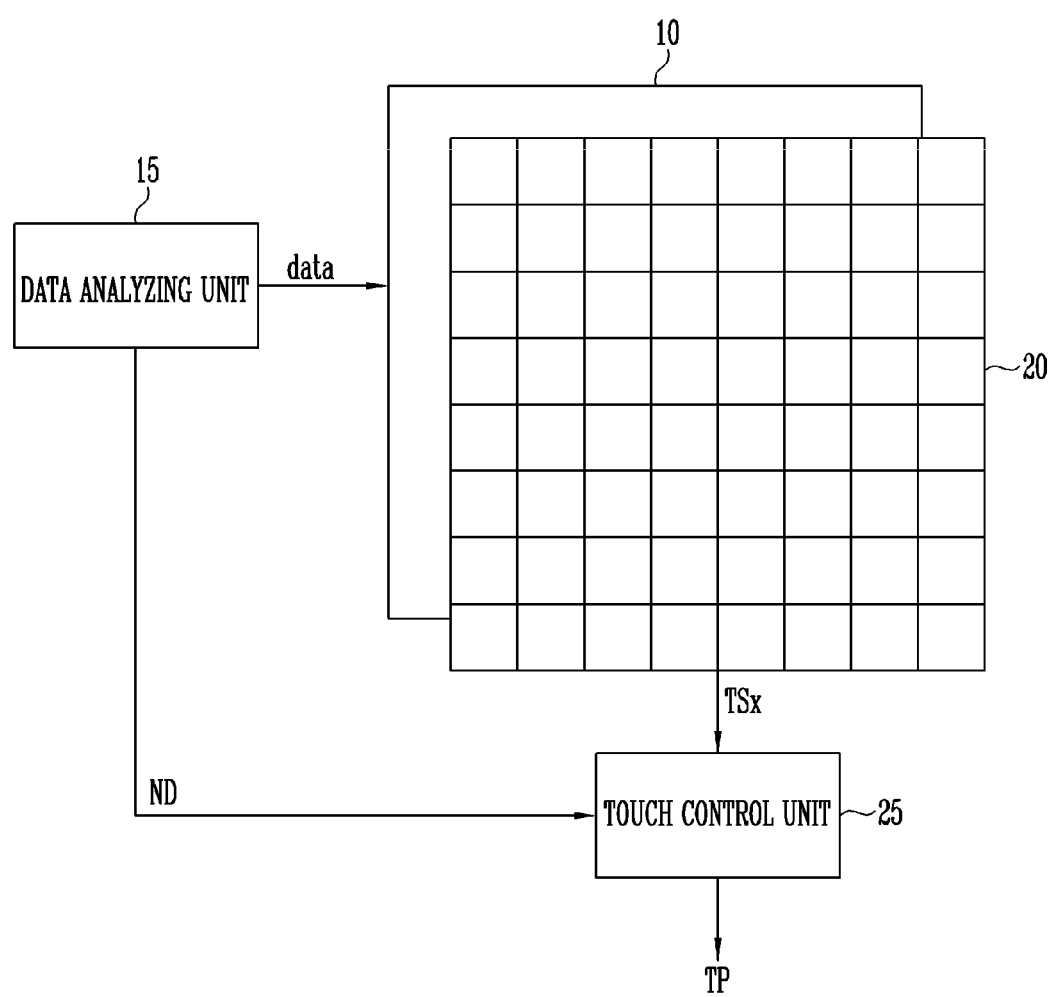

TOUCH SENSITIVE DISPLAY DEVICE HAVING RESISTANCE TO NOISE, AND CONTROL METHODS THEREFOR

CROSS-REFERENCE TO RELATED APPLICATION

This application claims priority to, and the benefit of, Korean Patent Application No. 10-2015-0144781 filed on Oct. 16, 2015 in the Korean Intellectual Property Office, the entire contents of which are incorporated herein by reference in their entirety.

BACKGROUND

1. Field

Embodiments of the present invention relate generally to touch sensitive displays. More specifically, embodiments of the present invention relate to touch sensitive display devices having resistance to noise, and control methods therefor.

2. Description of the Related Art

A touch screen panel may be implemented as a resistive, a photosensing, or a capacitive type touch screen. A capacitive touch screen panel calculates a touch position by sensing a change in capacitance formed in sensing electrodes when a hand of a person or a stylus pen is in contact with sensing electrodes of a touch sensing unit. Particularly, the touch screen panel may calculate a touch position by sampling a plurality of touch sensing signals sensed during a predetermined sensing period.

In the meantime, the touch screen panel may be separately manufactured and attached on one surface of a display panel, or may be directly patterned and formed within the display panel. This latter approach yields a touch screen panel integrated display device, in which the touch screen panel is combined with the display panel, and has been widely used. However, predetermined noise corresponding to a change in a voltage may be generated at a time of the supply of a data signal to the display panel, and the generated noise may change capacitance between the display panel and the touch sensing unit, so that a touch error may be generated.

In order to prevent touch error, the touch screen panel integrated display device may control the touch sensing unit so that a touch is not driven, or a touch is not sensed, in a section in which a voltage of a data signal of the display panel is changed. That is, a sensing period may be set to be short so as to avoid coupling noise between the display panel and the touch sensing unit due to the driving of the display panel. However, when the sensing period is decreased, the number of touch sensing signals sensed during the sensing period is decreased. Accordingly, when the number of touch sensing signals is decreased, there is a problem in that a degree of influence of external noise is increased.

SUMMARY

An exemplary embodiment provides a touch sensitive display device, including: a display panel configured to display an image according to received image data; a touch sensing unit configured to generate touch sensing signals in response to a touch; a data analyzing unit configured to determine a noise period from the image data; and a touch control unit configured to set a sensing period that is outside the noise period, and to calculate a touch position based on the touch sensing signals corresponding to the sensing period and not to the noise period.

The data analyzing unit may calculate a size of a coupling noise between the display panel and the touch sensing unit by analyzing the image data on a horizontal line basis. The data analyzing unit may determine those horizontal periods of one frame period in which the coupling noise at least equals a predetermined reference value, and designates these determined horizontal periods as the noise period.

The data analyzing unit may calculate the size of the coupling noise corresponding to an $i^{th}$ horizontal line according to:

$$CN(CouplingNoise)_i = \sum_{j=1}^{j=m} a_j * g(f(\text{data}_{i+1,j}) - f(\text{data}_{i,j}))$$

Here, i and j are natural numbers, $\text{data}_{i+1,j}$ is an image data value corresponding to a pixel in an $i+1^{th}$ row and a $i^{th}$ column, $\text{data}_{i,j}$ is an image data value corresponding to a pixel in an $i^{th}$ row and the $j^{th}$ column, $f( )$ is a function of a voltage applied to the data line according to the image data value, $g( )$ is a function of coupling noise generated in the touch sensing unit by a voltage variation of the data line, and $a_j$ is a weighting coefficient of a $j^{th}$ data line.

The weighting coefficient may decrease from data lines proximate to a center of the display panel to data lines proximate to a side of the display panel. The data analyzing unit may generate noise information for the noise period, and supply the generated noise information to the touch control unit.

The touch sensing unit may include first sensing electrodes and second sensing electrodes crossing the first sensing electrodes. The touch control unit may include: a touch driving circuit configured to supply touch driving signals to the first sensing electrodes; and a touch sensing circuit configured to sense the touch sensing signals corresponding to the touch driving signals through the second sensing electrodes. The touch control unit may supply the touch driving signals during the sensing period, and interrupt a supply of the touch driving signals during the noise period. The touch control unit may supply the touch driving signals during the noise period and the sensing period.

The touch control unit may calculate a touch position based only on touch sensing signals sensed outside the noise period. The touch control unit may calculate the touch position based on a representative value obtained by averaging the touch sensing signals corresponding to the sensing period.

Another exemplary embodiment of the present invention provides a method of controlling a touch sensitive display device, which includes a display panel for displaying an image according to received image data and a touch sensing unit for generating touch sensing signals in response to a touch, the method including: determining a noise period from the image data; setting a sensing period to be outside the noise period; and calculating a touch position based on only those touch sensing signals corresponding to the sensing period.

The determining a noise period may further include calculating a size of a coupling noise between the display panel and the touch sensing unit by analyzing the image data on a horizontal line basis. The determining a noise period may further include determining those horizontal periods of one frame period in which the coupling noise at least equals a predetermined reference value, and designating these determined horizontal periods as the noise period.

The determining a noise period may further include calculating the size of the coupling noise corresponding to an $i^{th}$ horizontal line according to:

$$CN(CouplingNoise)_i = \sum_{j=1}^{j=m} a_j * g(f(\text{data}_{i+1,j}) - f(\text{data}_{i,j}))$$

Here, i and j are natural numbers, $\text{data}_{i+1,j}$ is an image data value corresponding to a pixel in an $i+1^{th}$ row and a $j^{th}$ column, $\text{data}_{i,j}$ is an image data value corresponding to a pixel in an $i^{th}$ row and the $j^{th}$ column, f( ) is a function of a voltage applied to the data line according to the image data value, g( ) is a function of coupling noise generated in the touch sensing unit by a voltage variation of the data line, and $a_j$ is a weighting coefficient of $j^{th}$ data line.

The weighting coefficient may decrease from data lines proximate to a center of the display panel to data lines proximate to a side of the display panel. The calculating a touch position may further include calculating the touch position based on a representative value obtained by averaging the touch sensing signals corresponding to the sensing period.

According to embodiments of the present invention, a touch sensitive display device determines a noise period by analyzing image data, and sets a sensing period to avoid the noise period. That is, the sensing period is not fixed, and is flexibly set according to the image data. When a size of a coupling noise is small, it is not necessary to avoid the noise period, so that the sensing period is set to be long. When the sensing period is long, the number of touch sensing signals sensed during the sensing period is increased. Further, when the number of touch sensing signals, which are targets for sampling, is increased, external noise is offset, so that it is possible to decrease the influence of external noise.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. The various figures thus may not be to scale. It will be understood that when an element is referred to as being "between" two elements, it can be the only element between the two elements, or one or more intervening elements may also be present. Like reference numerals refer to like elements throughout.

FIG. 1 is a schematic block diagram representation of a display device integrated with a touch screen panel according to an exemplary embodiment of the present invention.

DETAILED DESCRIPTION OF THE INVENTION

Figure 2A:
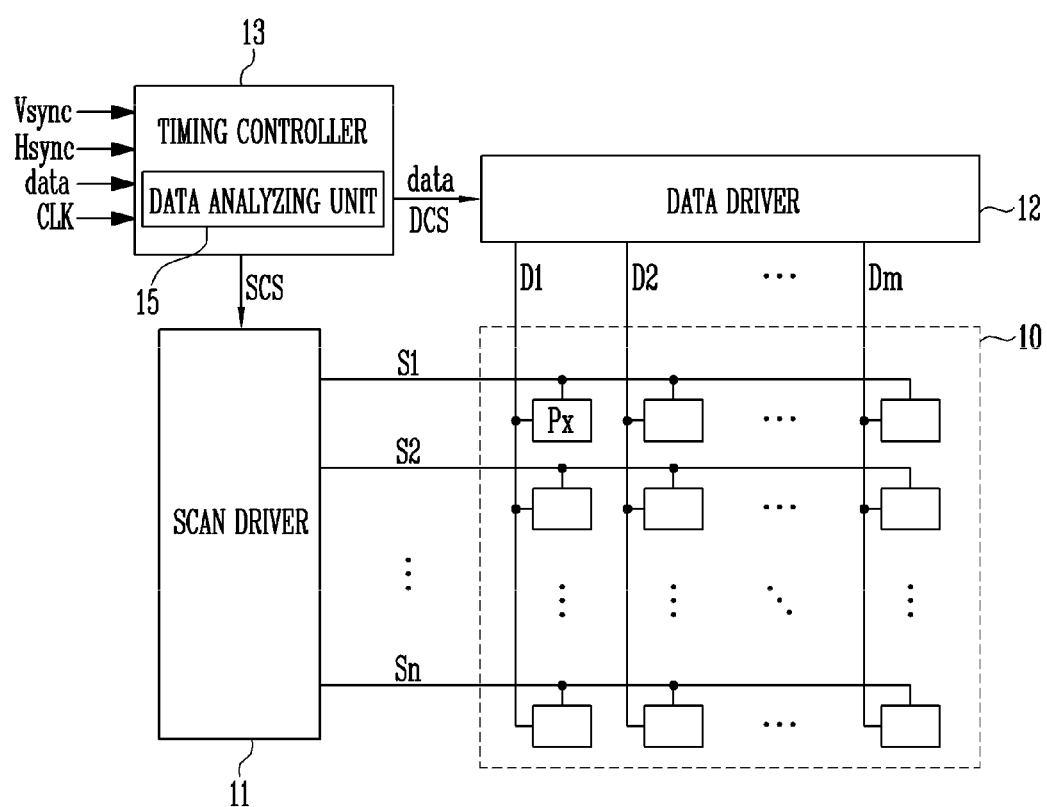
FIGS. 2A and 2B are more detailed block diagram representations of the display device integrated with the touch screen panel illustrated in FIG. 1.

Hereinafter, an exemplary embodiment of the present invention will be described in detail with reference to the accompanying drawings. All numerical values are approximate, and may vary. All examples of specific materials and compositions are to be taken as nonlimiting and exemplary only. Other suitable materials and compositions may be used instead.

FIG. 1 is a block diagram representation of a display device integrated with a touch screen panel according to an exemplary embodiment of the present invention.

Referring to FIG. 1, a display device integrated with a touch screen panel according to an exemplary embodiment of the present invention includes a display panel 10, a data analyzing unit 15, a touch sensing unit 20, a touch control unit 25.

The display panel 10 displays an image based on image data shown as "data" in FIG. 1. The display panel 10 may be a liquid crystal display panel or an organic light emitting display panel. The display panel 10 may include a driving circuit (not illustrated) for displaying an image. This will be described in more detail below.

The touch sensing unit 20 outputs touch sensing signals TSx generated by a contact of a hand of a person or a stylus pen. The touch sensing unit 20 may be a resistive, a photosensing, or a capacitive touch sensing unit. When the touch sensing unit 20 is a capacitive touch sensing unit, the touch sensing signals TSx may be electric signals for capacitance.

In one exemplary embodiment, the touch sensing unit 20 may be disposed on the display panel 10. Particularly, the touch sensing unit 20 may be manufactured in the form of a film and bonded onto an upper substrate (not illustrated) of the display panel 10. In another exemplary embodiment, the touch sensing unit 20 may be formed inside the display panel 10 by an in-cell method. Particularly, the touch sensing unit 20 may be formed on a lower substrate (not illustrated) of the display panel together with a pixel array, within the display panel 10.

The data analyzing unit 15 determines a noise period by analyzing the image data data supplied to the display panel 10. When the image is displayed on the display panel 10, coupling noise may be generated by electrical coupling between the display panel 10 and the touch sensing unit 20. Particularly, the display panel 10 displays an image at voltages corresponding to the image data data, and when a change in voltage is large, influence on the touch sensing unit 20, that is, coupling noise, is increased. Accordingly, the data analyzing unit 15 may analyze the image data data in advance and predict a size of coupling noise generated in the touch sensing unit 20 and a time duration during which the coupling noise is generated, before the image data data is supplied to the display panel 10. The data analyzing unit 15 may determine this time duration according to the time period during which the coupling noise would exceed a reference value, and such period may be referred to as a noise period. Then, the data analyzing unit 15 may direct the touch control unit 25 to avoid touch sensing during the noise period by generating noise information ND about the noise period and supplying the generated noise information ND to the touch control unit 25.

The touch control unit 25 sets a sensing period to avoid the noise period. Particularly, the touch control unit 25 receives the touch sensing signals TSx through the touch sensing unit 20 during the sensing period. Here, the sensing period is set in advance so as to avoid the noise period. The touch control unit 25 may recognize the noise period in advance by the noise information ND provided from the data analyzing unit 15. That is, before the display panel 10 displays a specific image based on specific image data data, the touch control unit 25 sets a sensing period so as to avoid the noise period specified by the noise information ND. Then, the touch control unit 25 receives the touch sensing signals TSx during the sensing period, which is synchronized with a display timing, while the display panel displays the specific image.

Then, the touch control unit 25 calculates a touch position TP based on the touch sensing signals TSx corresponding to the sensing period. In one exemplary embodiment, the touch control unit 25 may calculate the touch position TP by sampling the touch sensing signals TSx. Particularly, the touch control unit 25 may calculate a representative value by accumulating and averaging data values which are obtained by digitizing the touch sensing signals TSx of a predetermined period, for example, a frame unit. Then, the touch control unit 25 may determine whether a touch is generated by comparing the representative value to a touch reference value.

Figure 2B:
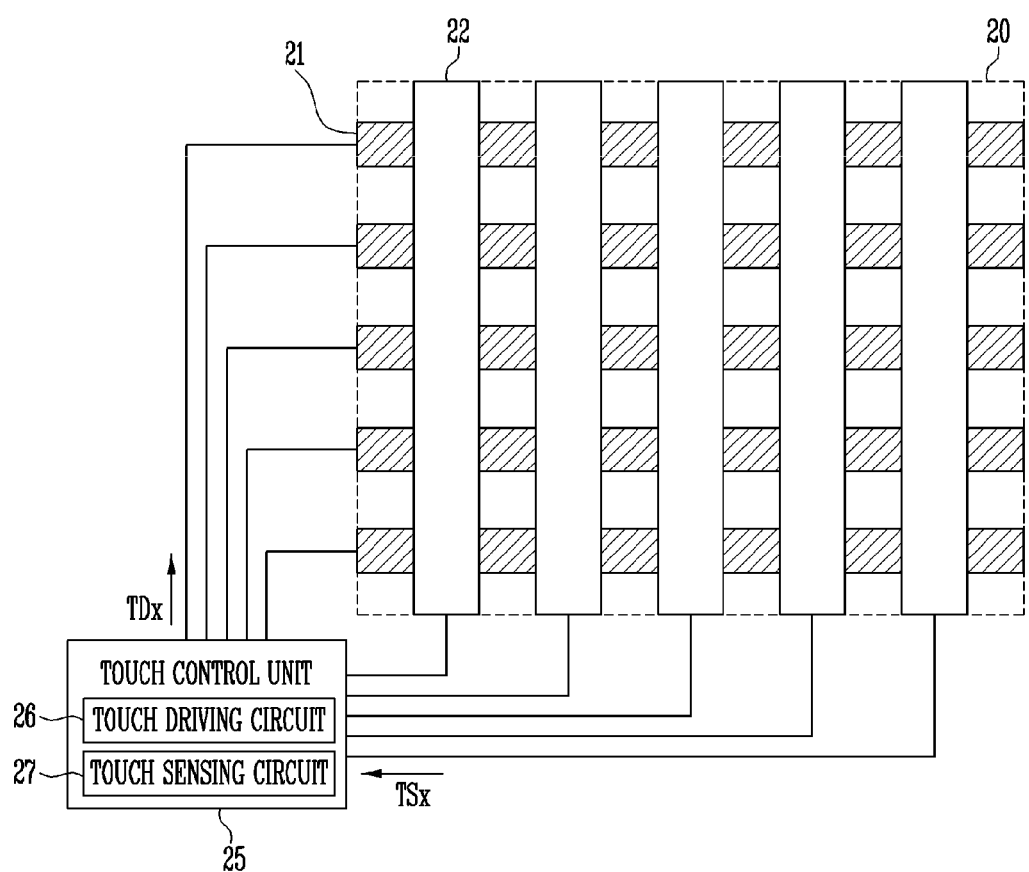

FIGS. 2A and 2B are more detailed block diagram representations of the display device integrated with the touch screen panel illustrated in FIG. 1.

Referring to FIG. 2A, the display device integrated with the touch screen panel according to the exemplary embodiment of the present invention may further include a scan driver 11, a data driver 12, and a timing controller 13. Here, the scan driver 11 and the data driver 12 may be configured to be embedded in the display panel 10, and the timing controller 13 may be configured to include the data analyzing unit 15. Further, the display panel 10 includes pixels Px driven by scan lines S1 to Sn and data line D1 to Dm.

The pixels Px are selected in groups corresponding to one horizontal line in accordance with a scan signal supplied to any one of the scan lines S1 to Sn. In this case, each of the pixels Px selected by the scan signal receives a data signal from the data line (any one of the data lines D1 to Dm) connected to each pixel. Each of the pixels Px receiving the data signal generates light with predetermined brightness, in accordance with the data signal.

The scan driver 11 is connected with the scan lines S1 to Sn, generates the scan signal in response to a scan control signal SCS of the timing controller 13, and outputs the generated scan signal to the scan lines S1 to Sn. In one exemplary embodiment, the scan driver 11 may contain a plurality of stage circuits, and may sequentially supply the scan signal to the scan lines S1 to Sn.

The data driver 12 is connected with the data lines D1 to Dm, generates a data signal in response to a data control signal DCS of the timing controller 13, and outputs the generated data signal to the data lines D1 to Dm. In this case, the data driver 12 converts the image data data from digital form provided from the timing controller 13 into an analog data signal (or voltage). The data driver 140 supplies the data signal to the data lines D1 to Dm so as to be synchronized with the scan signal.

The timing controller 13 receives the image data data and synchronization signals Vsync and Hsync, a clock signal CLK, and the like for controlling the display of the image data data. The timing controller 13 corrects the input image data data so as to be appropriate to the display of the image on the particular format of the display panel 10, and outputs the corrected image data data to the data driver 12. Further, the timing controller 13 may generate driving control signals SCS and DCS, for controlling the driving of the scan driver 11 and the data driver 12 based on the synchronization signals Vsync and Hsync and the clock signal CLK.

Referring to FIG. 2B, the touch sensing unit 20 according to the exemplary embodiment of the present invention may include first sensing electrodes 21, and second sensing electrodes 22 crossing the first sensing electrodes 21. The first sensing electrodes 21 and the second sensing electrodes 22 may be formed on different layers or the same layer on a transparent substrate (not illustrated), and may be formed of a transparent conductive material. In this case, the transparent conductive material may be, for example, an indium tin oxide (ITO), an indium zinc oxide (IZO), a carbon nano tube (CNT), or graphene.

In the meantime, FIG. 2B illustrates that the first sensing electrodes 21 and the second sensing electrodes 22 are arranged in an orthogonally crossing form, but this is merely one exemplary embodiment, and in addition, the first sensing electrodes 21 and the second sensing electrodes 22 may be arranged in a geometrical crossing form (e.g., concentric lines and radial lines in a polar coordinate arrangement). Further, FIG. 2 illustrates that the first sensing electrodes 21 and the second sensing electrodes 22 have bar shapes, but this is merely one exemplary embodiment, and in addition, the first sensing electrodes 21 and the second sensing electrodes 22 may be implemented in, e.g., a diamond form or a mesh pattern.

The touch control unit 25 may include a touch driving unit 26 and a touch sensing circuit 27. The touch driving circuit 26 supplies touch driving signals TDx to the first sensing electrodes 21. Particularly, the touch driving circuit 26 may supply the touch driving signals TDx in the form of a pulse wave to each of the first sensing electrodes 21 during the sensing period. The touch sensing circuit 27 senses the touch sensing signals TSx corresponding to the touch driving signals TDx through the second sensing electrodes 22. Particularly, when a touch is not generated in the touch sensing unit 20, the touch sensing signals TSx have a predetermined waveform according to capacitance formed between the first sensing electrodes 21 and the second sensing electrodes 22. When a touch is generated in the touch sensing unit 20, the touch sensing signals TSx are altered according to a change in the capacitance at a position at which the touch is generated.

Figure 3A:
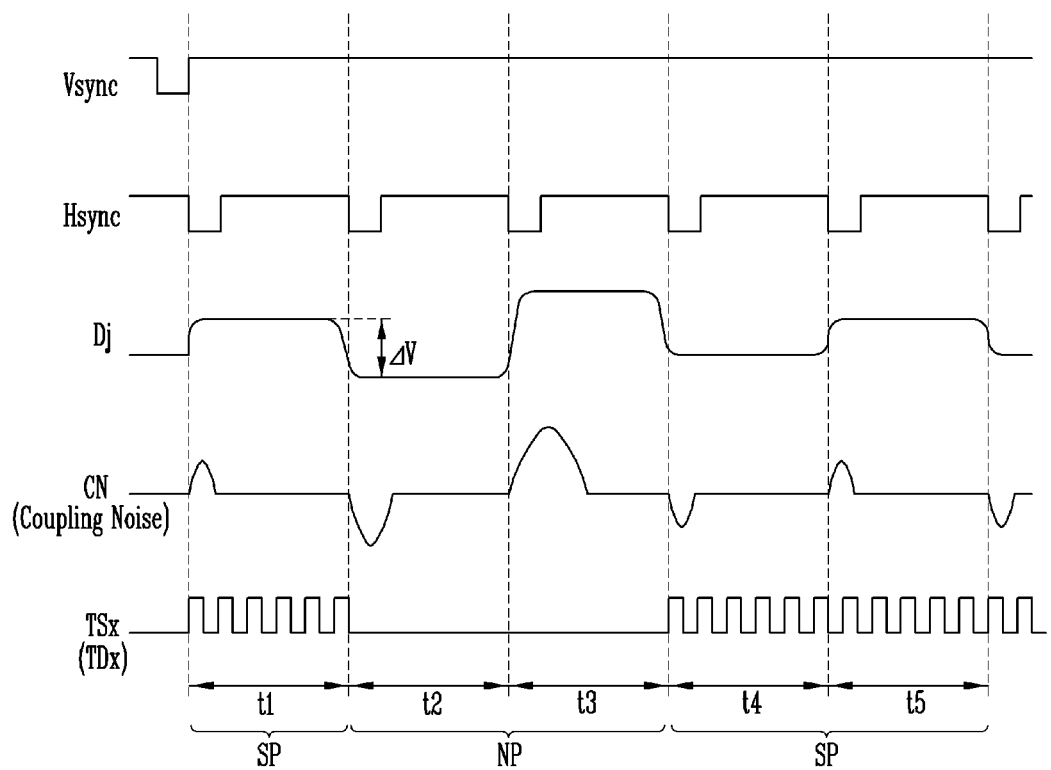
FIGS. 3A and 3B are waveform diagrams for describing a method of driving a touch in a sensing section according to an exemplary embodiment of the present invention.
Figure 3B:
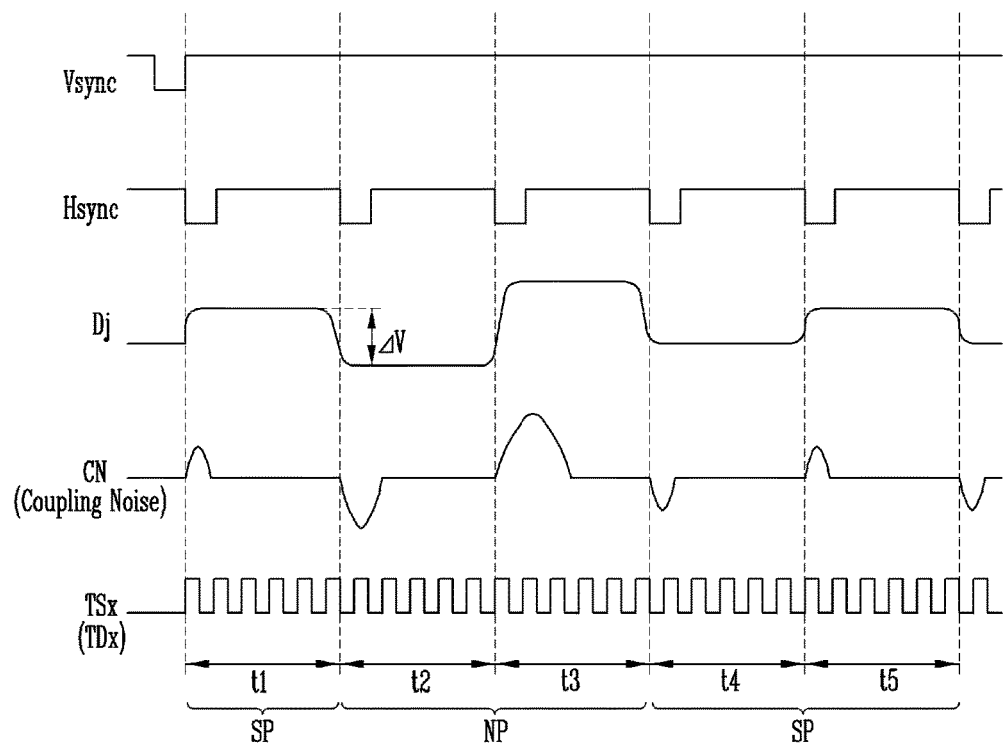

FIGS. 3A and 3B are waveform diagrams for describing a method of driving a touch in the sensing section according to an exemplary embodiment of the present invention.

Referring to FIGS. 3A and 3B, a vertical period may be defined by the vertical synchronization signal Vsync and a horizontal period may be defined by the horizontal synchronization signal Hsync. Image data of one frame is output in the vertical period, and the image data of this frame is output in groups of one horizontal line per horizontal period. Each of first to fifth periods t1 to t5 corresponds to one horizontal period.

The data analyzing unit 15 calculates a size of the coupling noise CN in units of one horizontal line, by analyzing the image data data. Particularly, the data analyzing unit 15 designates a horizontal period in which a size of the coupling noise CN is equal to or larger than a reference value as a noise period NP. The image data data is a set of image data values which correspond to the pixels PX, respectively. The data driver 12 supplies voltages corresponding to the image data values to the data lines D1 to Dm. The data analyzing unit 15 may predict a voltage variation quantity of the voltage by comparing the image data values sequentially supplied to one data line.

For example, the data analyzing unit 15 may compare the image data values supplied to a $j^{th}$ data line Dj, and predict a voltage variation quantity ($\Delta V$) corresponding to a difference in the image data values. Further, the size of the coupling noise CN is a function of the voltage variation quantity ($\Delta V$).

The touch control unit 25 sets the sensing periods SP to avoid the noise periods NP, in which the coupling noise CN is greater than or equal to the reference value. The touch control unit 25 may recognize a time period, in which the coupling noise CN is generated, in advance by the noise information ND provided from the data analyzing unit 15.

In one exemplary embodiment, the touch control unit 25 may supply the touch driving signals TDx during the sensing period SP, and interrupt the supply of the touch driving signals TDx during the noise period NP.

For example, as illustrated in FIG. 3A, it is assumed that the sizes of the coupling noise CN during a first period t1, a fourth period t4, and a fifth period t5 are equal to or smaller than the reference value, and the sizes of the coupling noise CN during a second period t2 and a third period t3 are equal to or larger than the reference value. The touch control unit 25 sets the second period t2 and the third period t3 as the noise period NP, and sets the first period t1, the fourth period t4, and the fifth period t5 as the sensing period SP based on the noise information NP provided from the data analyzing unit 15. Then, the touch control unit 25 outputs the touch driving signals TDx during the sensing period SP, and interrupts the supply of the touch driving signals TDx during the noise period NP. That is, the touch control unit 25 may turn off or disable the touch driving circuit 26 during the noise period NP. When the touch driving signals TDx are not supplied during the noise period NP, the touch sensing signal TSx is not sensed.

In another exemplary embodiment, the touch control unit 25 may supply the touch driving signals TDx during the noise period NP and the sensing period SP, and calculate a touch position based on the remaining touch sensing signals TSx excepting those touch sensing signals TSx sensed during the noise period NP.

For example, as illustrated in FIG. 3B, it is assumed that the sizes of the coupling noise CN during the first period t1, the fourth period t4, and the fifth period t5 are equal to or smaller than the reference value, and the sizes of the coupling noise CN during the second period t2 and the third period t3 are equal to or larger than the reference value. The touch control unit 25 sets the second period t2 and the third period t3 as the noise period NP, and sets the first period t1, the fourth period t4, and the fifth period t5 as the sensing period SP based on the noise information NP provided from the data analyzing unit 15. Then, the touch control unit 25 outputs the touch driving signals TDx during the noise period NP and the sensing period SP, and calculates a touch position based on the remaining touch sensing signals TSx besides those touch sensing signals TSx sensed during the noise period NP. That is, the touch control unit 25 continuously drives the touch driving circuit 26 even during the noise period NP, and calculates a touch position based on the touch sensing signals TSx sensed during the sensing period SP, while excluding the touch sensing signals TSx sensed during the noise period NP because the touch sensing signals TSx sensed during the noise period NP have a noise component.

The user may increase the sensing period while avoiding severe coupling noise, by appropriately setting the reference value of the coupling noise CN for determining the noise period NP. When the sensing period is increased, the number of touch sensing signals is increased, and when the number of touch sensing signals is increased, the external noise is offset, thereby improving touch performance.

Figure 4A:
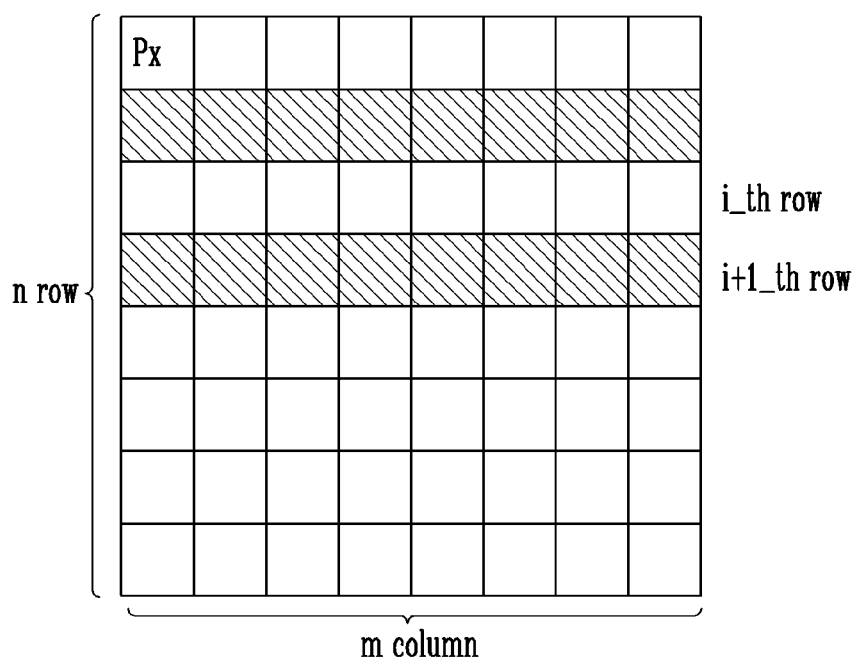
FIGS. 4A and 4B are diagrams of examples for describing a method of analyzing image data according to an exemplary embodiment of the present invention.
Figure 4B:
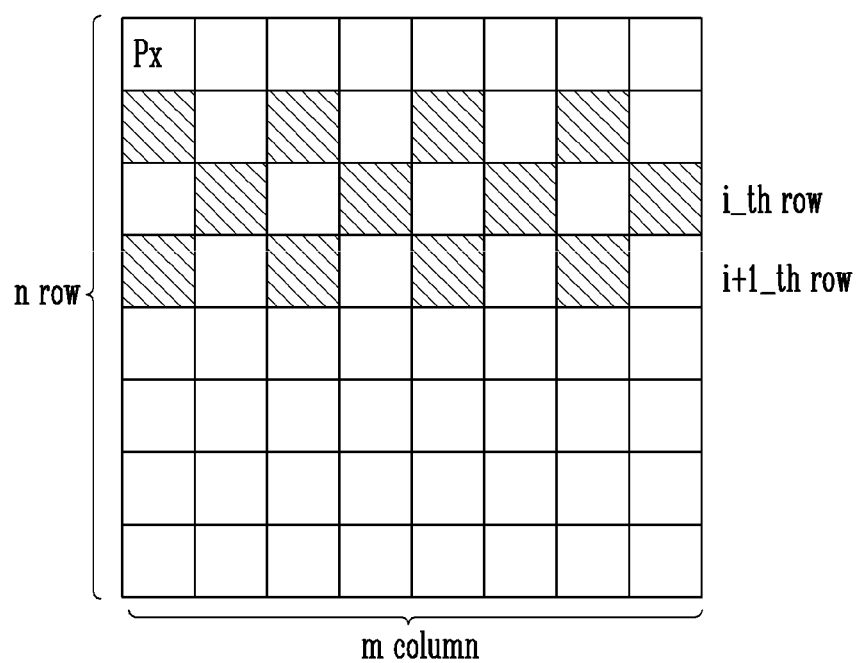

FIGS. 4A and 4B are diagrams of examples for describing a method of analyzing image data according to an exemplary embodiment of the present invention.

Referring to FIGS. 4A and 4B, the data analyzing unit 15 calculates a size of the coupling noise by horizontal line, by analyzing the image data. Particularly, the data analyzing unit 15 may predict a voltage variation quantity by comparing the image data values, which are sequentially supplied to the data lines, respectively, and calculate a size of the coupling noise per horizontal line by summing the predicted voltage variation quantities of the data lines.

In one exemplary embodiment, the data analyzing unit 15 may calculate a size of coupling noise CNi corresponding to an $i^{th}$ horizontal line by using the Equation below.

$$CN(CouplingNoise)_i = \sum_{j=1}^{j=m} a_j * g(f(\text{data}_{i+1,j}) - f(\text{data}_{i,j}))$$

Here, i and j are natural numbers, $\text{data}_{i+1,j}$ is an image data value corresponding to a pixel in an $i+1^{th}$ row and a $j^{th}$ column, $\text{data}_{i,j}$ is an image data value corresponding to a pixel in an $i^{th}$ row and the $i^{th}$ column, f( ) is a function of a voltage applied to the data line (any one of the data lines D1 to Dm) according to the image data value, g( ) is a function of coupling noise generated in the touch sensing unit by a voltage variation of the data line, and $a_j$ is a weighting coefficient of a $j^{th}$ data line.

The function of the voltage and the function of the coupling noise may be derived by a predetermined equation or a histogram. The weighting coefficient may be set to decrease from a center of the touch screen panel to a side of the touch screen panel. Further, the weighting coefficient may be calculated by an experimental/statistical method according to a model of a display device integrated with a touch screen, i.e. may be determined empirically or by simulation/modeling/analysis.

Voltages applied to the data lines D1 to Dm corresponding to m columns of the display panel 10 may be differently varied according to an image pattern, and the data signals of the m data lines D1 to Dm for a single pixel row are supplied within the same time period, so that the sum of the voltage variation quantities of the respective data lines determines the coupling noise CN applied to the touch sensing unit 20.

For example, as illustrated in FIG. 4A, when the image displayed on the display panel 10 has a white color in the $i^{th}$ row and a black color in the row, the voltages applied to the data lines are varied, and the variation in voltage contributes to the coupling noise CN to the touch sensing unit 20. As described above, the largest coupling noise CN is represented in a stripe pattern, in which white and black are alternately repeated within a horizontal line. However, as illustrated in FIG. 4B, for a checkerwise pattern, successive rows of stripe patterns are offset from each other, so that the coupling noise CN is offset and thus is not large.

Figure 5:
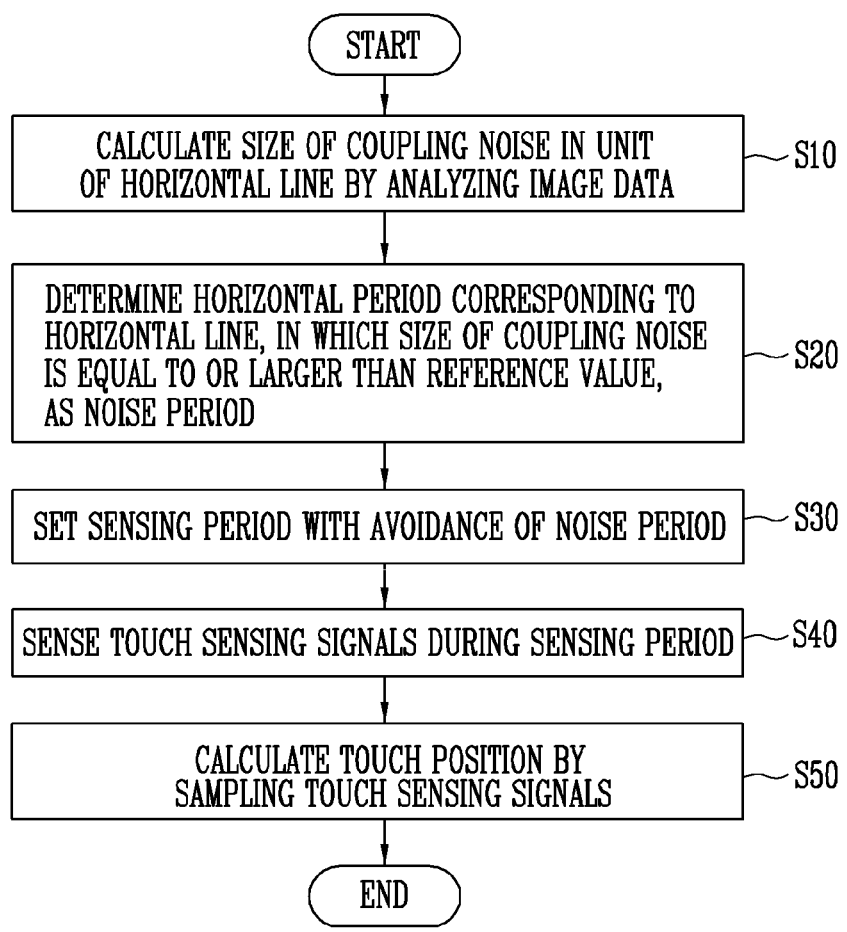
FIG. 5 is a flowchart for describing a method of controlling the display device integrated with the touch screen panel according to an exemplary embodiment of the present invention.

FIG. 5 is a flowchart for describing a method of controlling the display device integrated with the touch screen panel according to an exemplary embodiment of the present invention.

Referring to FIG. 5 together with FIG. 1, the data analyzing unit 15 calculates a size of coupling noise in the unit of the horizontal line by analyzing image data data (S10). The data analyzing unit 15 may predict a voltage variation quantity by comparing the image data values sequentially supplied to the data lines, respectively, i.e. by comparing corresponding image data values of successive frames.

The data analyzing unit 15 determines a horizontal period in which a size of the coupling noise CN is equal to or larger than a reference value, designating this period as a noise period NP (S20). The touch control unit 25 then sets a sensing period SP to avoid the noise period NP.

That is, the touch control unit 25 sets the sensing period SP to avoid the noise period NP, i.e. those periods in which the coupling noise CN has the reference value or more (S30). The touch control unit 25 may recognize the noise period NP in advance by noise information ND provided from the data analyzing unit 15.

The touch control unit 25 outputs touch driving signals TDx during the sensing period SP, and senses the touch sensing signals TSx during the sensing period SP (S40). Here, the touch control unit 25 may interrupt the supply of touch driving signals TDx during the noise period, or exclude those touch driving signals TDx sensed during the noise period in the calculation.

Then, the touch control unit 25 calculates a touch position TP based on the sensed touch sensing signals TSx (S50). Particularly, the touch control unit 25 may calculate a representative value by accumulating and averaging data values obtained by digitizing the touch sensing signals TSx in a predetermined period, for example, a frame unit. Then, the touch control unit 25 may determine whether a touch is generated by comparing the representative value with a touch reference value.

According to the present invention, a display device integrated with the touch screen panel determines a noise period by analyzing image data, and sets a sensing period to avoid the noise period. That is, the sensing period is not fixed, and is flexibly set according to the image data. When a size of coupling noise is small, it is not necessary to avoid the noise period, so that the sensing period is set to be long. When the sensing period is long, the number of touch sensing signals sensed during the sensing period is increased. Further, when the number of touch sensing signals, which are targets for sampling, is increased, external noise is offset, so that it is possible to decrease influence of the external noise.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims. Various features of the above described and other embodiments can be mixed and matched in any manner, to produce further embodiments consistent with the invention.

What is claimed is:

1. A touch sensitive display device, comprising:
a display panel configured to display an image according to received image data;
a touch sensing unit configured to generate touch sensing signals in response to a touch;
a data analyzing unit configured to determine a noise period from the image data; and
a touch control unit configured to set a sensing period that is outside the noise period and to calculate a touch position based on the touch sensing signals corresponding to the sensing period and not to the noise period,
wherein the data analyzing unit calculates a size of a coupling noise between the display panel and the touch sensing unit corresponding to an $i^{th}$ horizontal line according to:

$$CN(CouplingNoise)_i = \sum_{j=1}^{j=m} a_j * g(f(\text{data}_{i+1,j}) - f(\text{data}_{i,j}))$$

where i and j are natural numbers, $\text{data}_{i+1,j}$ is an image data value corresponding to a pixel in an $i+1^{th}$ row and a jth column, $\text{data}_{i,j}$ is an image data value corresponding to a pixel in an $i^{th}$ row and the $j^{th}$ column, f( ) is a function of a voltage applied to the data line according to the image data value, g( ) is a function of coupling noise generated in the touch sensing unit by a voltage variation of the data line, and $a_j$ is a weighting coefficient of a $j^{th}$ data line.

2. The display device of claim 1, wherein the data analyzing unit determines those horizontal periods of one frame period in which the coupling noise at least equals a predetermined reference value, and designates these determined horizontal periods as the noise period.

3. The display device of claim 2, wherein the weighting coefficient decreases from data lines proximate to a center of the display panel to data lines proximate to a side of the display panel.

4. The display device of claim 1, wherein the data analyzing unit is further configured to generate noise information for the noise period, and to supply the generated noise information to the touch control unit.

5. The display device of claim 1, wherein the touch sensing unit includes first sensing electrodes and second sensing electrodes crossing the first sensing electrodes.

6. The display device of claim 5, wherein the touch control unit includes: a touch driving circuit configured to supply touch driving signals to the first sensing electrodes; and a touch sensing circuit configured to sense the touch sensing signals corresponding to the touch driving signals through the second sensing electrodes.

7. The display device of claim 6, wherein the touch control unit is further configured to supply the touch driving signals during the sensing period, and to interrupt a supply of the touch driving signals during the noise period.

8. The display device of claim 6, wherein the touch control unit is further configured to supply the touch driving signals during the noise period and the sensing period.

9. The display device of claim 8, wherein the touch control unit calculates a touch position based only on touch sensing signals sensed outside the noise period.

10. The display device of claim 1, wherein the touch control unit calculates the touch position based on a representative value obtained by averaging the touch sensing signals corresponding to the sensing period.

11. A method of controlling a touch sensitive display device which includes a display panel for displaying an image according to received image data and a touch sensing unit for generating touch sensing signals in response to a touch, the method comprising:
determining a noise period from the image data;
setting a sensing period that is outside the noise period; and
calculating a touch position based on only those touch sensing signals corresponding to the sensing period,
wherein the determining a noise period further includes calculating a size of a coupling noise between the display panel and the touch sensing unit corresponding to an $i^{th}$ horizontal line according to:

$$CN(CouplingNoise)_i = \sum_{j=1}^{j=m} a_j * g(f(\text{data}_{i+1,j}) - f(\text{data}_{i,j}))$$

where i and j are natural numbers, $\text{data}_{i+1,j}$ is an image data value corresponding to a pixel in an $i+1^{th}$ row and a $j^{th}$ column, $\text{data}_{i,j}$ is an image data value corresponding to a pixel in an $i^{th}$ row and the $j^{th}$ column, f( ) is a function of a voltage applied to the data line according to the image data value, g( ) is a function of coupling noise generated in the touch sensing unit by a voltage variation of the data line, and $a_j$ is a weighting coefficient of $j^{th}$ data line.

12. The method of claim 11, wherein the determining a noise period further includes determining those horizontal periods of one frame period in which the coupling noise at least equals a predetermined reference value, and designating these determined horizontal periods as the noise period.

13. The method of claim 12, wherein the weighting coefficient decreases from data lines proximate to a center of the display panel to data lines proximate to a side of the display panel.

14. The method of claim 11, wherein the calculating a touch position further includes calculating the touch position based on a representative value obtained by averaging the touch sensing signals corresponding to the sensing period.

* * * * *